(12) United States Patent
Wu et al.

(10) Patent No.: US 12,439,303 B2
(45) Date of Patent: Oct. 7, 2025

(54) METHOD OF FAILURE HANDLING IN CONDITIONAL HANDOVER

(71) Applicant: Lenovo (Beijing) Ltd., Beijing (CN)

(72) Inventors: Lianhai Wu, Chaoyang (CN);
Bingchao Liu, Changping District (CN); Haiming Wang, Xicheng District (CN); Jie Shi, Haidian District (CN);
Jing Han, Chaoyang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 537 days.

(21) Appl. No.: 17/791,786

(22) PCT Filed: Jan. 10, 2020

(86) PCT No.: PCT/CN2020/071473
§ 371 (c)(1),
(2) Date: Jul. 8, 2022

(87) PCT Pub. No.: WO2021/138905
PCT Pub. Date: Jul. 15, 2021

(65) Prior Publication Data
US 2023/0059975 A1    Feb. 23, 2023

(51) Int. Cl.
*H04W 4/00* (2018.01)
*H04W 36/00* (2009.01)
(Continued)

(52) U.S. Cl.
CPC ..... *H04W 36/0079* (2018.08); *H04W 36/305* (2018.08); *H04W 36/362* (2023.05); *H04W 48/20* (2013.01); *H04W 36/00838* (2023.05)

(58) Field of Classification Search
CPC .......... H04W 36/0079; H04W 36/305; H04W 36/362; H04W 48/20; H04W 36/00838; H04W 76/19
See application file for complete search history.

(56) References Cited

U.S. PATENT DOCUMENTS 8,861,475 B2 * 10/2014 Jaiswal ............. H04W 36/0235
455/436
9,155,014 B2 * 10/2015 Tenny ................. H04W 36/302
(Continued)

FOREIGN PATENT DOCUMENTS

CN    106941701 A    7/2017
CN    108243469 A    7/2018
(Continued)

OTHER PUBLICATIONS 20911601.1, "Extended European Search Report", EP Application No. 20911601.1, Sep. 21, 2023, 11 pages.
(Continued)

*Primary Examiner* — Stephen M D Agosta
(74) *Attorney, Agent, or Firm* — FIG. 1 Patents

(57) ABSTRACT

The present application is related to a method of failure handling in conditional handover. A method performed by a user equipment (UE) comprises: receiving a Conditional Handover (CHO) configuration; initiating a re-establishment procedure if one of a plurality first conditions is met; performing a cell selection procedure; performing a CHO procedure if a cell selected through the cell selection procedure is configured with the CHO configuration; and performing the re-establishment procedure if the selected cell is not configured with the CHO configuration.

15 Claims, 7 Drawing Sheets

(51) Int. Cl.
  *H04W 36/30* (2009.01)
  *H04W 36/36* (2009.01)
  *H04W 48/20* (2009.01)

(56) References Cited

U.S. PATENT DOCUMENTS

| | | | | |
|---|---|---|---|---|
| 9,591,545 | B2* | 3/2017 | Tamura | H04W 36/304 |
| 9,986,483 | B1* | 5/2018 | Balmakhtar | H04W 36/008355 |
| 10,021,606 | B1* | 7/2018 | Oroskar | H04W 36/302 |
| 10,356,678 | B2* | 7/2019 | Guo | H04W 36/0064 |
| 10,827,398 | B2* | 11/2020 | Park | H04W 36/0016 |
| 11,818,620 | B2* | 11/2023 | Chang | H04W 36/0069 |
| 11,902,843 | B2* | 2/2024 | Da Silva | H04W 36/00837 |
| 2008/0254802 | A1* | 10/2008 | Ohta | H04W 36/026 455/440 |
| 2009/0086677 | A1* | 4/2009 | Ho | H04W 36/02 370/331 |
| 2009/0109926 | A1* | 4/2009 | Meylan | H04W 36/02 370/331 |
| 2010/0056129 | A1* | 3/2010 | Kono | H04W 28/22 455/419 |
| 2011/0122843 | A1* | 5/2011 | Iwamura | H04W 76/19 370/331 |
| 2011/0250925 | A1* | 10/2011 | Han | H04W 36/0079 455/524 |
| 2012/0238307 | A1* | 9/2012 | Grannan | H04W 88/06 455/515 |
| 2013/0337811 | A1* | 12/2013 | Faerber | H04W 36/008357 455/436 |
| 2014/0334371 | A1* | 11/2014 | Kim | H04W 8/24 370/311 |
| 2015/0092746 | A1* | 4/2015 | Jang | H04W 36/0094 370/331 |
| 2015/0223129 | A1* | 8/2015 | Liang | H04W 36/00837 370/331 |
| 2016/0345222 | A1* | 11/2016 | Axmon | H04W 36/0072 |
| 2018/0227815 | A1* | 8/2018 | Sharma | H04W 76/15 |
| 2018/0279186 | A1 | 9/2018 | Park et al. | |
| 2018/0359299 | A1* | 12/2018 | Chou | H04L 65/765 |
| 2019/0021043 | A1* | 1/2019 | Youn | H04W 12/06 |
| 2019/0223073 | A1* | 7/2019 | Chen | H04W 36/0077 |
| 2019/0281511 | A1* | 9/2019 | Susitaival | H04W 36/362 |
| 2019/0380081 | A1* | 12/2019 | Chang | H04W 36/0069 |
| 2019/0387438 | A1* | 12/2019 | Chang | H04W 76/27 |
| 2020/0029251 | A1* | 1/2020 | Wu | H04W 36/0016 |
| 2020/0077314 | A1* | 3/2020 | Hwang | H04W 76/27 |
| 2020/0084683 | A1* | 3/2020 | Moosavi | H04W 36/249 |
| 2020/0205051 | A1* | 6/2020 | Takehana | H04B 7/15542 |
| 2020/0245215 | A1* | 7/2020 | Han | H04W 8/22 |
| 2020/0336957 | A1* | 10/2020 | Wu | H04W 36/00837 |
| 2020/0351731 | A1* | 11/2020 | Kim | H04W 36/0094 |
| 2020/0374960 | A1* | 11/2020 | Deenoo | H04W 76/19 |
| 2020/0404561 | A1* | 12/2020 | Alabbasi | H04W 92/12 |
| 2021/0029600 | A1* | 1/2021 | Balan | H04W 36/0094 |
| 2021/0051542 | A1* | 2/2021 | Jokela | H04W 36/0077 |
| 2021/0076271 | A1* | 3/2021 | Jokela | H04W 36/0072 |
| 2021/0168678 | A1* | 6/2021 | Deenoo | H04W 36/305 |
| 2021/0274404 | A1* | 9/2021 | Koziol | H04W 36/0094 |
| 2021/0297907 | A1* | 9/2021 | Jokela | H04W 36/00835 |
| 2021/0321310 | A1* | 10/2021 | Latheef | H04W 36/0077 |
| 2021/0360495 | A1* | 11/2021 | Lovlekar | H04W 36/362 |
| 2022/0007246 | A1* | 1/2022 | de Silva | H04W 36/305 |
| 2022/0124519 | A1* | 4/2022 | Xu | H04W 36/362 |
| 2022/0377630 | A1* | 11/2022 | Wu | H04W 36/0079 |
| 2023/0040285 | A1* | 2/2023 | Parichehrehteroujeni | H04W 36/0079 |
| 2023/0292214 | A1* | 9/2023 | Yan | H04W 36/362 |
| 2024/0172055 | A1* | 5/2024 | He | H04W 36/249 |
| 2025/0081070 | A1* | 3/2025 | Damnjanovic | H04W 36/0079 |

FOREIGN PATENT DOCUMENTS

| | | |
|---|---|---|
| CN | 110366212 A | 10/2019 |
| CN | 110612741 A | 12/2019 |
| WO | 2012137034 A1 | 10/2012 |
| WO | 2019195060 A1 | 10/2019 |

OTHER PUBLICATIONS

CATT (Rapporteur), "Report on Email Discussion [107b#52][NR MobE] Open Issues Conditional PSCell Addition/Change (CATT)", 3GPP TSG-RAN WG2 Meeting #108, R2-1916300, Reno, USA [retrieved Nov. 9, 2023]. Retrieved from the Internet <https://www.3gpp.org/ftp/tsg_ran/WG2_RL2/TSGR2_108/Docs>, Nov. 2019, 46 pages.

CATT, "Discussion on the Working Assumption Related Issues", 3GPP TSG-RAN WG2 Meeting #107bis, R2-1912132, Chongqing, P.R. China [retrieved Aug. 23, 2022]. Retrieved from the Internet <https://www.3gpp.org/ftp/tsg_ran/WG2_RL2/TSGR2_107bis/Docs>., Oct. 2019, 4 Pages.

PCT/CN2020/071473, "International Preliminary Report on Patentability", PCT Application No. PCT/CN2020/071473, Jul. 21, 2022, 6 pages.

PCT/CN2020/071473, "International Search Report and Written Opinion", PCT Application No. PCT/CN2020/071473, Oct. 10, 2020, 7 pages.

ZTE, "TP for TS37.340 BLCR Conditional PScell&SCG Management in MR-DC", 3GPP TSG RAN WG3#105bis, R3-195112, Chongqing, China [retrieved Aug. 23, 2022]. Retrieved from the internet <https://www.3gpp.org/ftp/tsg_ran/WG3_Iu/TSGR3_105bis/Docs?sortby-sizerev>., Oct. 2019, 17 Pages.

202080092539.8, "Foreign Office Action", CN Application No. 202080092539.8, Sep. 20, 2024, 18 pages.

* cited by examiner

METHOD OF FAILURE HANDLING IN CONDITIONAL HANDOVER

TECHNICAL FIELD

The present application generally relates to wireless communication, and more particularly, to failure handling in conditional handover (CHO).

BACKGROUND

A base station (BS) can have some cells (or areas) to provide communication service. In 3GPP Release 17, when a UE needs to handover from a serving cell of a source base station (BS) to a target cell of a target BS, a handover procedure (e.g. a failure handling mechanism, a conditional handover (CHO) procedure, etc.) and a cell selection procedure before the handover procedure are performed. A CHO is defined as a handover that is executed by the UE when one or more handover execution conditions are met.

3GPP 5G NR adopts a failure handling mechanism in CHO. However, details of the failure handling mechanism in CHO have not been discussed in 3GPP 5G NR technology yet.

SUMMARY

One aspect of the present disclosure provides a method performed by a user equipment (UE), wherein the method comprises: receiving a Conditional Handover (CHO) configuration; initiating a re-establishment procedure if one of a plurality first conditions is met; performing a cell selection procedure; performing a CHO procedure if a cell selected through the cell selection procedure is configured with the CHO configuration; and performing the re-establishment procedure if the selected cell is not configured with the CHO configuration.

Another aspect of the present disclosure provides a method performed by a user equipment (UE), wherein the method comprises: receiving a Conditional Handover (CHO) configuration for Secondary Node (SN) change; initiating a procedure to report information indicating a CHO failure from a source SN to a target SN if one of the following conditions is met: CHO based SN change failure; and CHO based SN addition failure; and reporting the information indicating the CHO failure to a Master Node (MN).

Another aspect of the present disclosure provides a method performed by a network node, wherein the method comprises: receiving, from a source Secondary Node (SN), a request of performing a CHO based SN change procedure from the source SN to a target SN; transmitting, to a User Equipment (UE), a CHO configuration for the CHO based SN change procedure; receiving, from the UE, information indicating failure of the CHO based SN change procedure; transmitting, to the source SN, the information indicating failure of the CHO based SN change procedure.

Another aspect of the present disclosure provides a method performed by a source Secondary Node (SN), wherein the method comprises: transmitting, to a master node (MN), a request of performing a CHO based SN change procedure from the source SN to a target SN with one or more conditional handover (CHO) conditions; and receiving, from the MN, information indicating failure of the CHO based SN change procedure.

Another aspect of the present disclosure provides a method performed by a user equipment (UE), wherein the method comprises: receiving a conditional handover (CHO) configuration for Secondary Node (SN) change; performing a CHO based SN change once an execution condition associated with the CHO configuration is met; and starting a timer once the CHO configuration is applied.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Multi-Radio Dual Connection (MR-DC)

With the development of the fifth generation mobile communication technology (5G), in the deployment of operators, the base stations working in the evolved Universal Mobile Telecommunications System (UMTS) terrestrial radio access (E-UTRA) system and the base stations working in the 5G new radio (NR) system can be configured to communicate with the user equipment (EP) together, that is, the UE can be connected at the same time to the base station (eNB) working in the E-UTRA system and the base station (gNB) working in the NR system, we can use both the frequency of the E-UTRA system and the frequency of the NR system to transmit data, so as to improve the throughput of the UE. This kind of UE is connected to two different base stations at the same time, which can be called Multi-Radio Dual Connectivity (MR-DC).

In MR-DC architecture, a multiple Rx/Tx capable UE may be configured to utilize resources provided by two different nodes connected via non-ideal backhaul, one providing NR access and the other one providing either E-UTRA or NR access. One node acts as the Master Node (MN) and the other as the Secondary node (SN). The MN and SN are connected via a network interface and at least the MN is connected to the core network.

Figure 1:
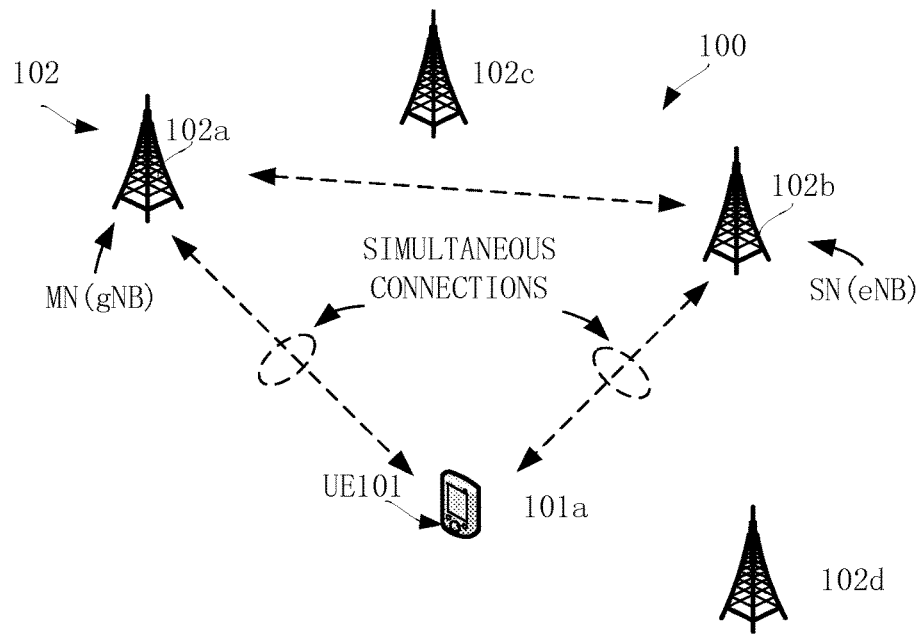
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one multiple Rx/Tx UE 101 and at least one BS 102. In particular, for illustrative purpose, the wireless communication system 100 includes one UE 101 (e.g., UE 101a) and four BSs 102 (e.g., BS 102a, BS 102b, BS 102c, BS 102d), and BS 102a is a gNB as the MN, and BS 102b is a eNB as the SN. That is, FIG. 1 shows a NR-E-UTRA Dual Connection (NE-DC). Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Control Plane for DC

Figure 2:
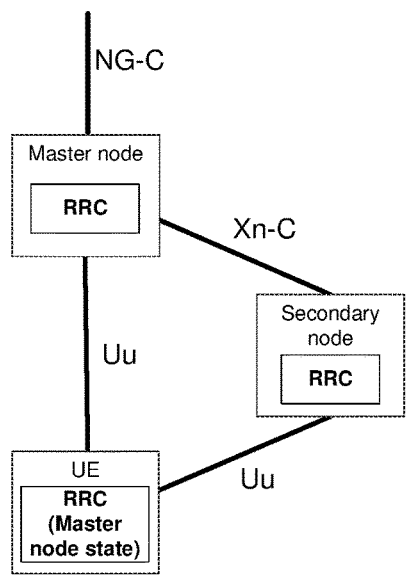
FIG. 2 illustrates a block diagram of a MR-DC wireless communication system in accordance with some embodiments of the present application.

As illustrated in FIG. 2, in MR-DC, the UE has a single Radio Resource Control (RRC) state, based on the MN RRC and a single C-plane connection towards the Core Network. FIG. 2 illustrates the Control plane architecture for MR-DC. Each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

Master Cell Group is, in MR-DC, a group of serving cells associated with the Master Node, comprising of the SpCell (PCell) and optionally one or more SCells.

Master node is, in MR-DC, the radio access node that provides the control plane connection to the core network. It may be a Master eNB (in EN-DC), a Master ng-eNB (in NGEN-DC) or a Master gNB (in NR-DC and NE-DC).

Multi-Radio Dual Connectivity is Dual Connectivity between E-UTRA and NR nodes, or between two NR nodes.

PCell is the SpCell of a master cell group.

PSCell is the SpCell of a secondary cell group.

Secondary Cell Group is, in MR-DC, a group of serving cells associated with the Secondary Node, comprising of the SpCell (PSCell) and optionally one or more SCells.

Secondary node is, in MR-DC, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SpCell is the primary cell of a master or secondary cell group.

Conditional Handover (Pcell Change in MN)

A Conditional Handover (CHO) is defined as a handover that is executed by the UE when one or more handover execution conditions are met. UE starts evaluating the execution condition(s) upon receiving the CHO configuration, and stops evaluating the execution condition during the CHO execution once the execution condition(s) is met.

The following principles apply to CHO:

- The CHO configuration contains the configuration of CHO candidate cell(s) generated by the candidate gNB (s) and execution condition(s) generated by the source gNB.
- An execution condition may consist of one or two trigger condition(s) (A3/5). Only single RS type is supported and at most two different execution quantities (e.g. RSRP and RSRQ, RSRP and SINR, etc.) can be configured simultaneously for the evaluation of CHO execution condition of a single candidate cell.
- Before any CHO execution condition is satisfied, upon reception of HO command (without CHO configuration), the UE executes the HO procedure as described in clause 9.2.3.2, regardless of any previously received CHO configuration.
- While executing CHO, i.e. from the time when the UE starts synchronization with target cell, UE does not monitor source cell.

C-Plane Handling

As in intra-NR RAN handover, in intra-NR RAN CHO, the preparation and execution phase of the conditional handover procedure is performed without involvement of the 5GC; i.e., preparation messages are directly exchanged between gNBs. The release of the resources at the source gNB during the conditional handover completion phase is triggered by the target gNB.

Figure 3:
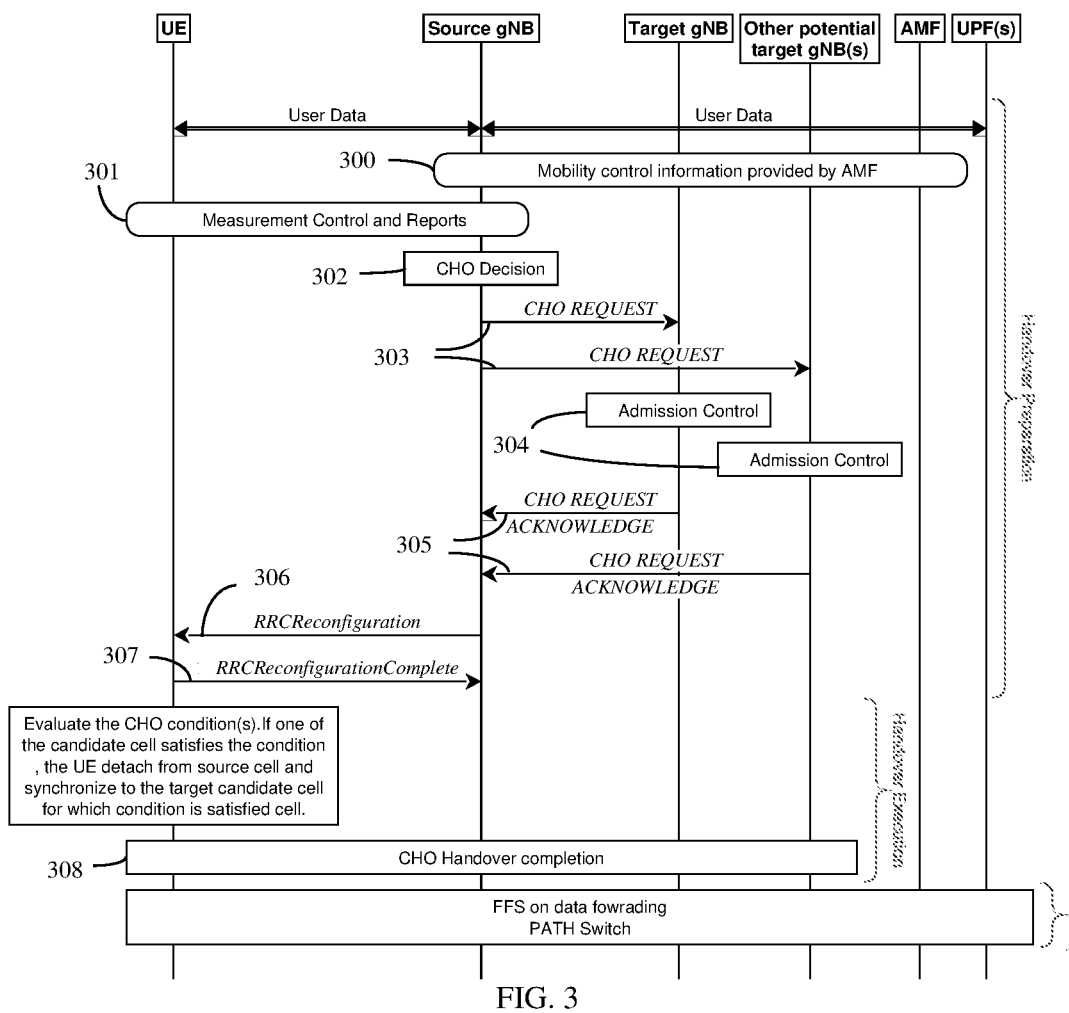
FIG. 3 illustrates an Intra-AMF/UPF Conditional Handover procedure in accordance with some embodiments of the present application.

FIG. 3 depicts the basic conditional handover scenario where neither the AMF nor the UPF changes. The procedure of FIG. 3 are explained in details as follows:

Step 300: The UE context within the source gNB contains information regarding roaming and access restrictions which were provided either at connection establishment or at the last TA update.

Step 301: The source gNB configures the UE measurement procedures and the UE reports according to the measurement configuration.

Step 302: The source gNB decides to use CHO.

Step 303: The source gNB issues a CHO Request message to one or more candidate gNBs.

Step 304: Admission Control may be performed by the target gNB.

Step 305: The candidate gNB sends CHO response including configuration of CHO candidate cell to the source gNB.

Step 306: The source gNB sends a RRCReconfiguration message to the UE, containing the configuration of CHO candidate cell(s) and CHO execution condition (s).

Step 307: UE sends an RRCReconfigurationComplete message to the source gNB.

Step 308: UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that Conditional Handover (MN/SN Initiated SN Change)

Same as in CHO for PCell mobility, a multiple PScells are configured to the UE in conditional PScell addition/change. Unlikely in CHO, PScell supports a secondary connection between the UE and the network. In rel-15, only one SN is allowed to be active at a time. Similarly, even though, it is likely that multiple configured PScell may satisfy the conditional PScell addition/change, the UE should only be allowed to have connection to a single active PScell at a time.

The SN change can be triggered either by the MN or the SN in conventional SN change. The SN change initiated by the MN (only for inter-frequency SN change), the MN can make the decision based on measurements configured by the MN. This scenario is similar to the SN addition.

For SN changes initiated by the SN, the RRM measurement configuration is maintained by the SN which also processes the measurement reporting, without providing the measurement results to the MN. Also the MN is not aware of measurement configuration by the SN. In order to support, conditional SN change to intra-RAT measurements on serving and non-serving frequency configured by the SN, the SN should decide on conditional SN change execution condition and it should be defined by the measurement identity configured by the source SN. Otherwise, significant change should be introduced to the measurement coordination between the MN and SN. We think such significant specification change should be avoided.

Figure 4:
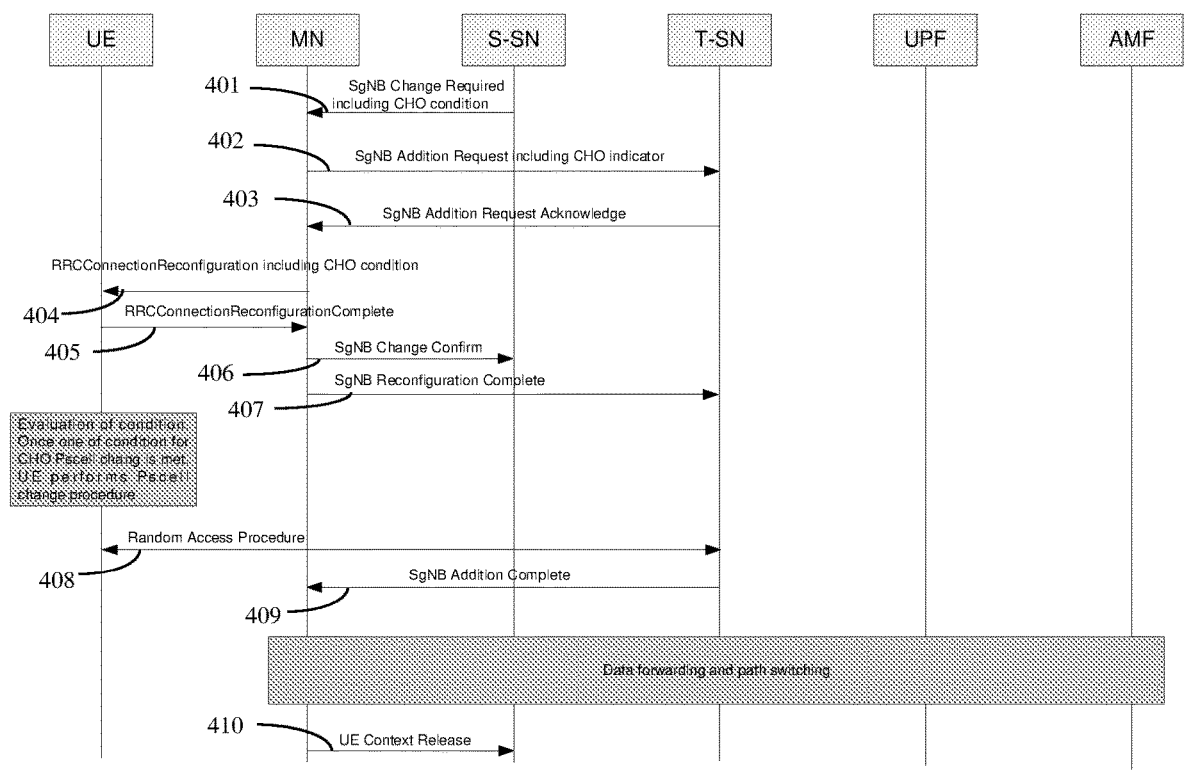
FIG. 4 illustrates a SN initiated CHO based SN change procedure in accordance with some embodiments of the present application.

FIG. 4 depicts the SN initiated CHO based SN Change scenario. The procedure of FIG. 4 are explained in details as follows:

Step 401. The source SN initiates the CHO based SN change procedure by sending SgNB Change Required message which contains target SN ID information and may include the SCG configuration and measurement results related to the target SN.

CHO execution condition per candidate T-SN is also included.

Step 402. The MN requests the target SN to allocate resources for the UE by means of the SgNB Addition procedure, including the measurement results related to the target SN received from the source SN.

In step 2, CHO indictor will be included.

Step 403. If forwarding is needed, the target SN provides forwarding addresses to the MN. The target SN includes the indication of the full or delta RRC configuration.

Step 404. The MN indicates the new configuration to the UE in the RRCConnectionReconfiguration message including the NR RRC configuration message generated by the target SN.

In Step 404, CHO execution condition per candidate T-SN is also included.

Step 405. The UE stores the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

Step 406. If the allocation of target SN resources was successful, the MN confirms the CHO based SgNB change request.

Step 407. If the RRC connection reconfiguration procedure was successful, the MN informs the target SN via SgNB Reconfiguration Complete message with the encoded NR RRC response message for the target SN, if received from the UE.

Step 408. The UE synchronizes to the target SN once the condition is met.

Step 409. After UE accesses T-SN, data forwarding and path switching will be performed.

Step 410. MN transmits UE Context Release message to the source SN for releasing radio and C-plane related resource associated to the UE context.

Scenario A: Failure Handling for PCell CHO in Master Node (MN)

Currently, workgroup RAN2 has agreed a new re-establishment procedure initiated before CHO recovery, which is used for the case of RLF/CHO failure/HO failure recovery is as follows:
1. Re-establishment is initiated based on legacy trigger condition (5.3.7.2).
2. UE shall release the spCellConfig and other parameters (according to legacy 5.3.7.2)
3. T311 is started and UE performs cell selection;
4. If the selected cell is CHO cell, CHO is executed. Otherwise, re-establishment procedure is performed. (according to the agreed CR in RAN2 #108)

The above step 4 includes executing CHO, and CHO being executed includes UE applying CHO configuration for the selected candidate cell. However, the behavior of "UE applying CHO configuration" should refer to the source configuration (spCellConfig) in the case that delta configuration, which indicates only the differences with the original CHO configuration, is configured with CHO configuration. However, according to the above step 2, spCellConfig has been released already when UE applies CHO configuration To solve the above problem, the claimed invention provides three options:

Option 1: when UE initiates the re-establishment, UE shall release spCellConfig if one of the following condition is met:
Condition1-1: attemptCHO is not configured
Condition1-2: no CHO candidate cell is configured
Condition1-3: it is not the first cell selection after failure
Option 2: Another description for option1: when UE initiates the re-establishment, UE shall keep (or store) spCellConfig if one of the following condition is met:
Condition2-1: it is the first cell selection after failure and attemptCHO is configured
Condition2-2: it is the first cell selection after failure and at least one CHO candidate cell is configured
Condition2-3: it is the first cell selection after failure, attemptCHO is configured and at least one CHO candidate cell is configured Option 3: UE stores the corresponding source configuration when receiving the CHO configuration for one cell;

In the case that the spCellConfig is not released when initiating Re-establishment, the spCellConfig can be released once NR cell without CHO configuration is selected and/or CHO configuration is applied, the UE shall release spCellConfig.

Figure 5:
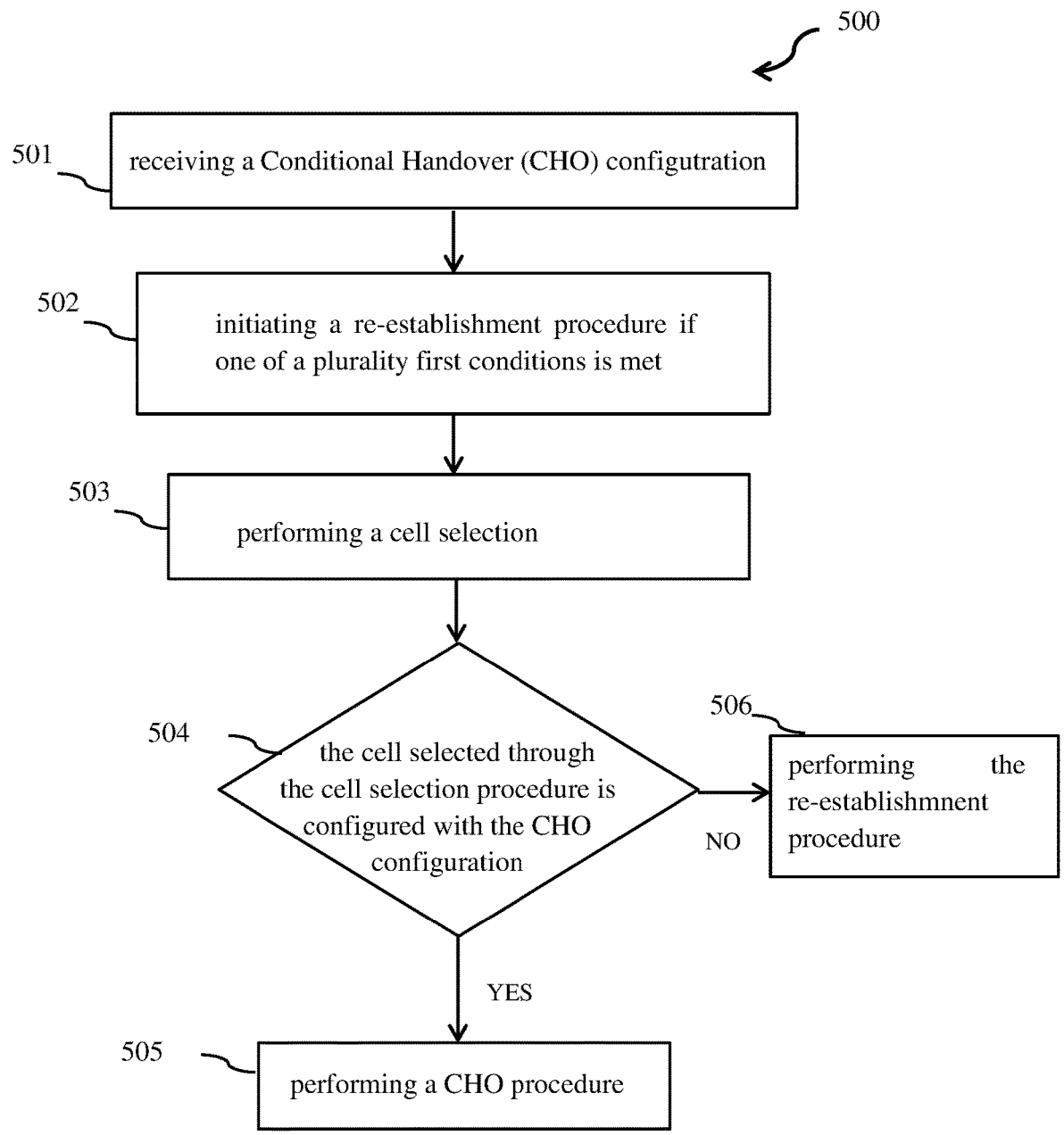
FIG. 5 illustrates a flow chart of a method for wireless communication in accordance with some embodiments of the present application.

FIG. 5 illustrates a flow chart of a method for wireless communication in accordance with some embodiments of the present application. The exemplary method 500 as illustrated and shown in FIG. 5 is performed by a UE which aims to handover from the PCell of MN 1 to a PCell of MN 2.

In the exemplary method 500, in operation 501, a UE (e.g., UE 101a as illustrated and shown in FIG. 1) receives a CHO configuration. The CHO configuration may be transmitted from a MN (eg. gNB 102a). After that, the UE initiates a re-establishment procedure if one of a plurality first conditions is met in operation 502. The plurality first conditions may be a RLF, a HO failure, and a CHO failure.

In operation 503, the UE performs a cell selection, and if the selected cell through the cell selection procedure is configured with the CHO configuration in operation 504, the UE performs a CHO procedure in operation 505, and if not, the UE performs the re-establishment procedure in operation 506.

According to one aspect of the present disclosure, when UE initiates the re-establishment, UE shall release spCellConfig if one of the following condition is met:
Condition1-1: attemptCHO is not configured
Condition1-2: no CHO candidate cell is configured
Condition1-3: it is not the first cell selection after failure
In addition, when UE initiates the re-establishment, UE shall keep (or store) spCellConfig if one of the following condition is met:
Condition2-1: it is the first cell selection after failure and attemptCHO is configured
Condition2-2: it is the first cell selection after failure and at least one CHO candidate cell is configured
Condition2-3: it is the first cell selection after failure, attemptCHO is configured and at least one CHO candidate cell is configured According to another aspect of the present disclosure, the UE stores the CHO configuration and the corresponding source configuration.

According to another aspect of the present disclosure, once NR cell without CHO configuration is selected and/or CHO configuration is applied, the UE shall release spCellConfig, the UE release spCellConfig.

Scenario B: SN Initiated CHO SN Change

For SCG, the SCG failure information procedure is used to inform the MN of SCG failure due to S-RLF, reconfiguration with sync failure, SCG configuration failure and integrity check failure. The UE suspends SCG transmission, resets SCG MAC and stops T304 if running, when SCG failure occurs. The MN takes action upon reception of the SCG failure information. In the legacy specification, SCG failure information will not be transmitted to source SN.

For the mobility failure case in LTE, UE will report e.g RLF report to the new serving cell. The serving cell will transmit RLF report from UE to the source gNB, which is used for network optimization purpose. (See 36.300 MRO section) For example, the RLF report can be used to optimize the 'handover border'. Similarly, the failure information can be transmitted to the SN initiating CHO SN change, which can be used to optimize e.g. CHO execution condition.

Accordingly, the claimed invention provides the following solution:

First, UE reports SCGfailureinformation to MN. The SCGfailureinformation may comprises at least one of the following four items:

(1) one or more triggering conditions for this CHO based SN change.

The one or more triggering conditions may comprise RS type and triggering quantities. The triggering quantities may be, for example, Reference Signal Receiving Power (RSRP) and Reference Signal Received Quality (RSRQ), or RSRP and Signal to Interference plus Noise Ratio (SINR).

(2) a beam index associated with preamble transmission.

The beam ID may be a selected Synchronization Signal Block (SSB) index, or a Channel State Information-Reference Signal (CSI-RS) index.

(3) The configured set $\bar{q}_o$ included in failureDetectionResources

A UE can be provided, for each BWP of a serving cell, a set $\bar{q}_o$ of periodic CSI-RS resource configuration indexes by failureDetectionResources.

The UE expects the set $\bar{q}_o$ to include up to two RS indexes. The UE expects single port RS in the set $\bar{q}_o$.

(4) Time elapsed since the SN change initialisation until connection failure.

This information is used by MN or SN to determine too early handover or not. Optionally, time elapsed information also can be stored by MN. If so, UE does not need to report time elapsed.

Then, MN indicates failure information to source SN for MRO purpose. The failure information may comprises at least one of the following four items:

(1) SCGfailureinformation.

SCGfailureinformation can be a container to be included in Xn message.

(2) T-SN ID in which CHO SN change failure happens.

(3) UE ID in SN or C-RNTI in SN.

(4) Type of detected SN change problem.

The type of detected SN change problem may be Too Early change or change to Wrong Cell.

The information is used in the case of recently completed SN change, when a failure occurs in the target cell (in T-SN) shortly after it sent the UE Context Release message to the source SN A. This information is also used when an RLF occurs before the UE Context Release message is sent, if the random access procedure in the target cell was completed successfully.

Figure 6:
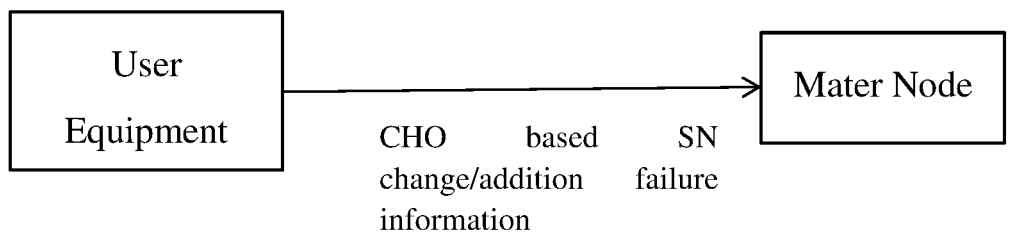
FIG. 6 illustrates an exemplary of transmission of failure information in accordance with some embodiments of the present application.
Figure 7:
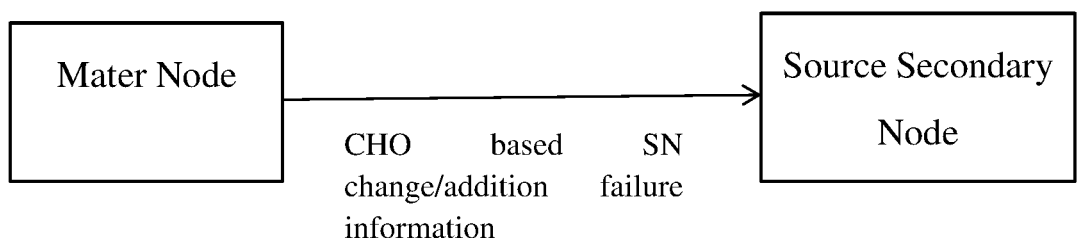
FIG. 7 illustrates a further exemplary of transmission of failure information message in accordance with some embodiments of the present application.

FIGS. 6 and 7 illustrate an exemplary of transmission of failure information in accordance with some embodiments of the present application. In particular, in FIG. 6, the UE transmits the CHO based SN change failure and/or the CHO based SN addition failure to a MN, and in FIG. 7, the MN transmits the CHO based SN change failure and/or the CHO based SN addition failure to a source SN.

Scenario C: MN or SN Initiated CHO SN Change

There is a possibility that the UE may receive a normal handover (i.e. PCell CHO in MN) request during CHO SN change, thus there is a case that the PCell handover and CHO SN change may happen at the same time. In legacy, since when to perform SN change is under MN control, MN can avoid this case happen. However, the CHO SN change is UE autonomous HO, thus the case cannot be avoided. Therefore, new UE behaviour should be specified in this new case.

To solve the above problem, the claimed invention provides the following solution:

The timer of RRC layer, T304, may be reused for CHO based SN change.

T304 is started once UE applies CHO SN change. UE stops this T304 for the CHO SN change upon reception of RRCReconfiguration message including reconfigurationWithSync for MCG. That is, UE stops T304 upon informed of a MN change. According, the definition of T304 should be changed as follows:

TABLE 1

| Timer | Start | Stop | Behavior |
|---|---|---|---|
| T304 | Upon reception of RRCReconfiguration message including reconfiguration WithSync; Once CHO configuration for SN change is applied; | Upon successful completion of random access on the corresponding SpCell For T304 of SCG, upon SCG release or upon reception of RRCReconfiguration message including reconfiguration WithSync for MCG | For T304 of MCG, in case of the handover from NR or intra-NR handover, initiate the RRC re-establishment procedure; In case of handover to NR, perform the actions defined in the specifications applicable for the source RAT. For T304 of SCG, inform network about the reconfiguration with sync failure by initiating the SCG failure information procedure as specified in 5.7.3. |

Figure 8:
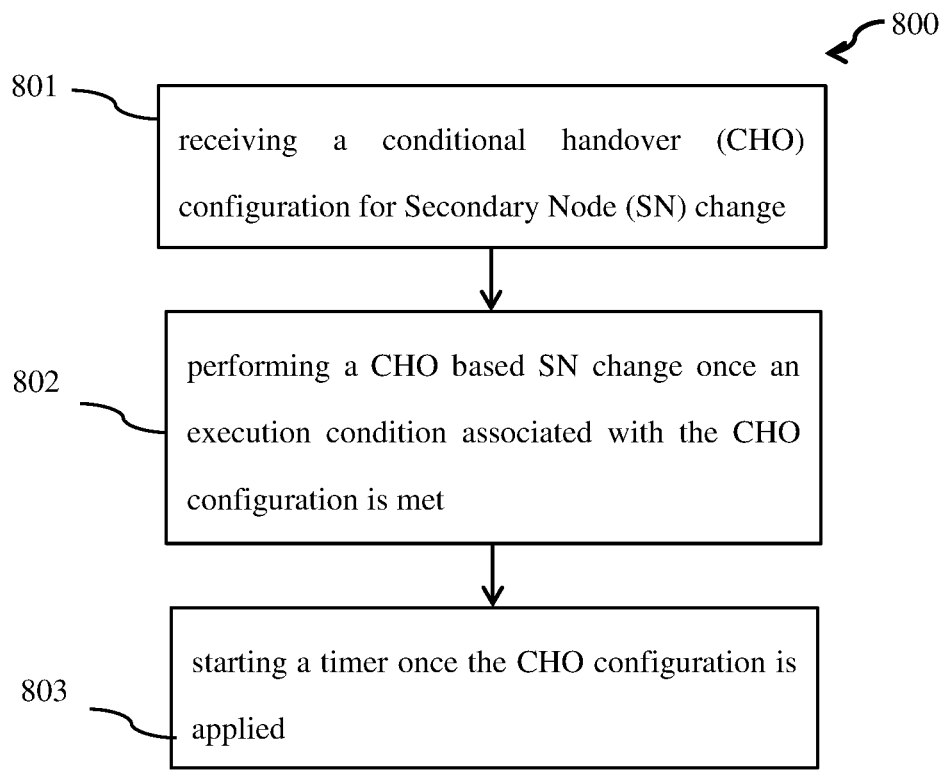
FIG. 8 illustrates a flow chart of another method for wireless communication in accordance with some embodiments of the present application.

As illustrated in the method 800 of FIG. 8, UE receives a conditional handover (CHO) configuration for Secondary Node (SN) change from MN or SN in operation in operation 801. Once the execution condition is met, UE performs CHO based SN change in operation 802. Once CHO configuration for SN change is applied, UE starts a timer in operation 802. The timer may be T304.

Figure 9:
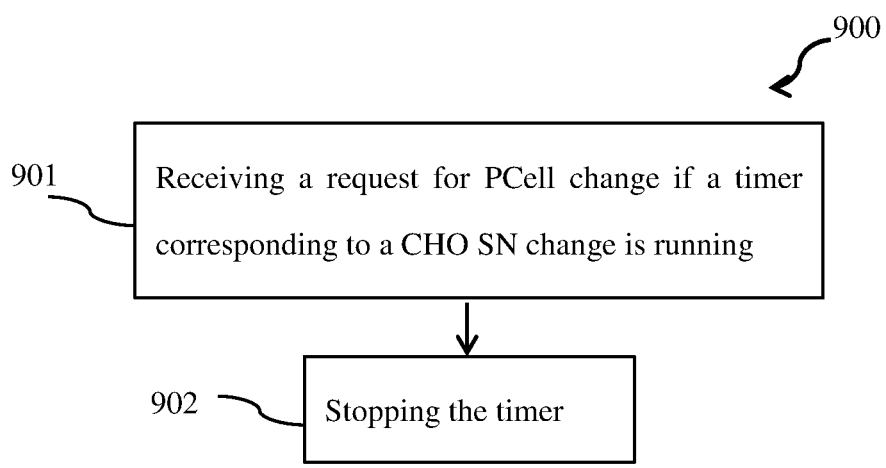
FIG. 9 illustrates a flow chart of another method for wireless communication in accordance with some embodiments of the present application.

As illustrated in the method 900 of FIG. 9, UE receives a request for PCell change if a timer corresponding to a CHO SN change is running in operation 901, and then UE stops the timer in operation 902.

Figure 10:
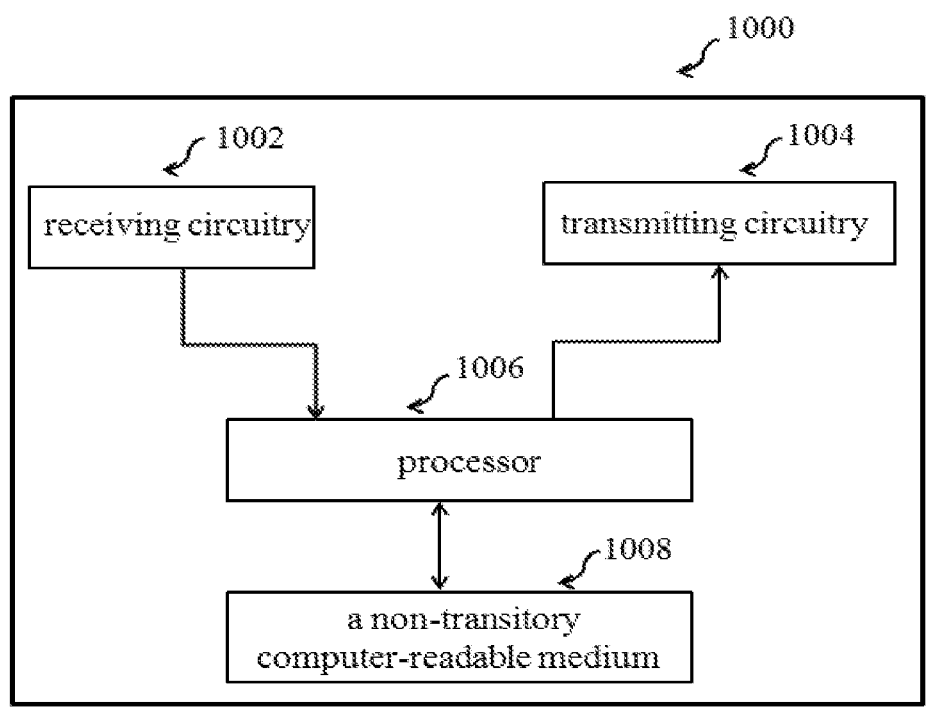
FIG. 10 illustrates a block diagram of an exemplary apparatus in accordance with some embodiments of the present application.

FIG. 10 illustrates a block diagram of an exemplary apparatus in accordance with some embodiments of the present application. Referring to FIG. 10, the apparatus 1000 includes a receiving circuitry 1002, a transmitting circuitry 1004, a processor 1006, and a non-transitory computer-readable medium 1008. The processor 1006 is coupled to the non-transitory computer-readable medium 1008, the receiving circuitry 1002, and the transmitting circuitry 1004.

It is contemplated that some components are omitted in FIG. 10 for simplicity. In some embodiments, the receiving circuitry 1002 and the transmitting circuitry 1004 may be integrated into a single component (e.g., a transceiver).

In some embodiments, the non-transitory computer-readable medium 1008 may have stored thereon computer-executable instructions to cause a processor to implement the operations with respect to UE(s) as described above. For example, upon execution of the computer-executable instructions stored in the non-transitory computer-readable medium 1008, the processor 1006 and the receiving circuitry 1002 performs the method of FIG. 5, including: receiving a Conditional Handover (CHO) configuration by the receiving circuitry 1002; initiating a re-establishment procedure if one of a plurality first conditions is met by the processor 1006; performing a cell selection procedure by the processor 1006; performing a CHO procedure if a cell selected through the cell selection procedure is configured with the CHO configuration by the processor 1006; and performing the re-establishment procedure if the selected cell is not configured with the CHO configuration by the processor 1006. In some embodiments, upon execution of the computer-executable instructions stored in the non-transitory computer-readable medium 1008, the processor 1006 and the receiving circuitry 1002 performs the method of FIG. 9, including: receiving a request for PCell change if a timer corresponding to a CHO SN change is running; and stopping the timer.

In some embodiments, the non-transitory computer-readable medium 1008 may have stored thereon computer-executable instructions to cause a processor to implement the operations with respect to BS(s) as described above. For example, upon execution of the computer-executable instructions stored in the non-transitory computer-readable medium 1008, the processor 1006 and the receiving circuitry 1002, perform the method of FIG. 8, including: receiving a conditional handover (CHO) configuration for Secondary Node (SN) change by the receiving circuitry 1002; performing a CHO based SN change once an execution condition associated with the CHO configuration is met by the processor 1006; and starting a timer once the CHO configuration is applied by the processor 1006.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
   receiving a conditional handover (CHO) configuration;
   initiating a re-establishment procedure if one of a plurality of first conditions is met, wherein the plurality of first conditions comprises a radio link failure (RLF), a CHO failure, and a handover (HO) failure;
   performing a cell selection procedure;
   releasing a PCell configuration if no CHO candidate cell is configured, attemptCHO is not configured, it is not a first cell selection after failure, or a cell without the CHO configuration is selected through the cell selection procedure;
   performing a CHO procedure if a cell selected through the cell selection procedure is configured with the CHO configuration; and
   performing the re-establishment procedure if the selected cell is not configured with the CHO configuration.

2. The method of claim 1, wherein initiating the re-establishment procedure further comprises keeping the PCell configuration based on at least one of:
   it is a first cell selection after failure and attemptCHO is configured;
   it is the first cell selection after failure and at least one CHO candidate cell is configured; or
   it is the first cell selection after failure, attemptCHO is configured, and the at least one CHO candidate cell is configured.

3. The method of claim 1, wherein the CHO configuration is received from a network node with a delta configuration.

4. The method of claim 1, further comprising:
   storing the CHO configuration and a corresponding source configuration after receiving the CHO configuration.

5. The method of claim 1, further comprising:
   releasing the PCell configuration if the CHO configuration of the selected cell is applied.

6. A user equipment (UE) for wireless communication, comprising:
   at least one memory; and
   at least one processor coupled with the at least one memory and configured to cause the UE to:
   receive a conditional handover (CHO) configuration;
   initiate a re-establishment procedure if one of a plurality of first conditions is met, wherein the plurality of first conditions comprises a radio link failure (RLF), a CHO failure, and a handover (HO) failure;
   perform a cell selection procedure;
   release a PCell configuration if no CHO candidate cell is configured, attemptCHO is not configured, it is not a first cell selection after failure, or a cell without the CHO configuration is selected through the cell selection procedure;

perform a CHO procedure if a cell selected through the cell selection procedure is configured with the CHO configuration; and perform the re-establishment procedure if the selected cell is not configured with the CHO configuration.

7. The UE of claim 6, wherein, to initiate the re-establishment procedure, the at least one processor is configured to cause the UE to keep the PCell configuration based on at least one of:

it is a first cell selection after failure and attemptCHO is configured;

it is the first cell selection after failure and at least one CHO candidate cell is configured; or it is the first cell selection after failure, attemptCHO is configured, and the at least one CHO candidate cell is configured.

8. The UE of claim 6, wherein the CHO configuration is received from a network node with a delta configuration.

9. The UE of claim 6, wherein the at least one processor is further configured to cause the UE to store the CHO configuration and a corresponding source configuration after receiving the CHO configuration.

10. The UE of claim 6, wherein the at least one processor is further configured to cause the UE to release the PCell configuration if the CHO configuration of the selected cell is applied.

11. A processor for wireless communication, comprising:

at least one controller coupled with at least one memory and configured to cause the processor to:

receive a conditional handover (CHO) configuration;

initiate a re-establishment procedure if one of a plurality of first conditions is met, wherein the plurality of first conditions comprises a radio link failure (RLF), a CHO failure, and a handover (HO) failure;

perform a cell selection procedure;

release a PCell configuration if no CHO candidate cell is configured, attemptCHO is not configured, it is not a first cell selection after failure, or a cell without the CHO configuration is selected through the cell selection procedure;

perform a CHO procedure if a cell selected through the cell selection procedure is configured with the CHO configuration; and perform the re-establishment procedure if the selected cell is not configured with the CHO configuration.

12. The processor of claim 11, wherein, to initiate the re-establishment procedure, the at least one controller is configured to cause the processor to keep a PCell configured based on at least one of:

it is a first cell selection after failure and the attemptCHO is configured;

it is the first cell selection after failure and at least one CHO candidate cell is configured; or it is the first cell selection after failure, the attemptCHO is configured, and the at least one CHO candidate cell is configured.

13. The processor of claim 11, wherein the CHO configuration is received from a network node with a delta configuration.

14. The processor of claim 11, wherein the at least one controller is further configured to cause the processor to store the CHO configuration and a corresponding source configuration after receiving the CHO configuration.

15. The processor of claim 11, wherein the at least one controller is further configured to cause the processor to release the PCell configuration if the CHO configuration of the selected cell is applied.

* * * * *